United States Patent [19]

Araki et al.

[11] 4,408,534
[45] Oct. 11, 1983

[54] GAS GENERATING CHARGE AND A PROCESS FOR PRODUCING THE SAME

[75] Inventors: Ikuo Araki; Teruo Kanazawa; Shinji Ito; Kenji Sumikawa, all of Aichi, Japan

[73] Assignee: Nippon Oil and Fats Co., Ltd., Tokyo, Japan

[21] Appl. No.: 296,708

[22] Filed: Aug. 27, 1981

[30] Foreign Application Priority Data

Sep. 1, 1980 [JP] Japan .................. 55-119861

[51] Int. Cl.³ .................. C06B 45/00; C06B 21/00
[52] U.S. Cl. ........................ 102/288; 86/1 R; 102/285; 102/291; 149/2; 149/19.8; 149/96; 149/97; 149/98; 149/99; 264/3 A
[58] Field of Search ............... 60/250, 253; 86/1 R; 102/284–291; 149/2, 19.8, 96, 97, 98, 99; 264/3 A

[56] References Cited

U.S. PATENT DOCUMENTS

| 552,919 | 1/1896 | Maxim | 102/284 X |
| 1,758,358 | 5/1930 | Ennis | 102/288 X |
| 2,991,168 | 7/1961 | Nadel | 149/2 |
| 3,396,661 | 8/1968 | Michael | 102/290 |

FOREIGN PATENT DOCUMENTS

| 32614 | 4/1908 | Austria | 86/1 R |
| 70325 | 12/1941 | Czechoslovakia | 102/285 |
| 2403589 | 9/1974 | Fed. Rep. of Germany | 102/291 |

Primary Examiner—Leland A. Sebastian
Attorney, Agent, or Firm—Flynn, Thiel, Boutell & Tanis

[57] ABSTRACT

A gas generating propellant charge which is made by piling explosive powder sheets having a plurality of projections on at least one surface thereof so as to make contact them with each other is excellent in firing characteristics, and the explosive powders in the gas generating propellant charge can be burnt in a short time, thereby generating a large amount of gas.

20 Claims, 6 Drawing Figures

GAS GENERATING CHARGE AND A PROCESS FOR PRODUCING THE SAME

FIELD OF THE INVENTION

This invention relates to a gas generating charge and a process for producing the same.

BACKGROUND OF THE INVENTION

Recently, there has been a need for a rocket propellant charge or a gas generating charge used for launching rockets, especially for launching small size missiles.

The rocket propellant charge needs to burn up in a short time and produce a relatively large thrust, and the gas generating charge also needs to burn up in a short time and generate a relative large amount of gas.

They are both used for launching rockets. The former is used in rocket motors of boosters and the latter is used in gas generator devices of launchers.

Charges in such rocket motors are of a short duration burn-up type and gas generator devices have been hitherto applied in the below stated manners.

The propellants are most generally used in single perforation or multiperforation form and they have been applied to multigrain systems for rocket motors in which tubular single or multiperforated propellants are charged in a rocket motor in a large number.

There has been known in a special case of a gun propellant charge a method for preparing a charge which comprises cutting a propellant in the form of sheets of a predetermined size, piling the resultant sheets and fixing them by threads.

However, these have respective particular drawbacks when they are applied in the rocket motors or the gas generator devices which generate pressures of 20 to 200 kg/cm² during the short burn-up time.

The single perforated or multiperforated propellant can not obtain a uniform pattern of burning surface area owing to the shape of the powder charge and the non-uniformity is remarkable in the pressure-time and/or thrust-time relation characteristics. Further, these propellants have defects in that when they are used for a rocket motor, they burn up into small grains, with the result that burning grains scatter on all sides and the burning efficiency thereby decreases.

Concerning single perforated propellants of the multigrain system, when they are used for a rocket motor, it is difficult to maintain them and consequently it is difficult to prevent some broken pieces of burning propellant from scattering out of a motor.

In addition, the above stated process comprising piling the sheets of propellant and fixing them by threads or the like is useful for a gun propellant in which such sheets are used under a pressure above 500 kg/cm² but is not useful for a rocket motor or a gas generating device in which it is used at a pressure in a range of 20–200 kg/cm², because a uniform combustion can not be obtained in this pressure range.

OBJECT OF THE INVENTION

An object of this invention is to provide a gas generating charge made from propellant granules in which each charge tablet or disk is not in face-to-face contact with other charge sheets or disks, and and which is excellent in firing characteristics.

Another object of this invention is to provide a gas generator charge having a uniform burning surface area pattern which shows stable pressure-time relation characteristics when it is used in a gas generator device.

A further object of this invention is to provide a gas generating chatge which has an extremely large efficiency for gas generation.

A still further object of this invention is to provide a gas generating charge which can be safely and simply produced.

SUMMARY OF THE INVENTION

Figure 1:
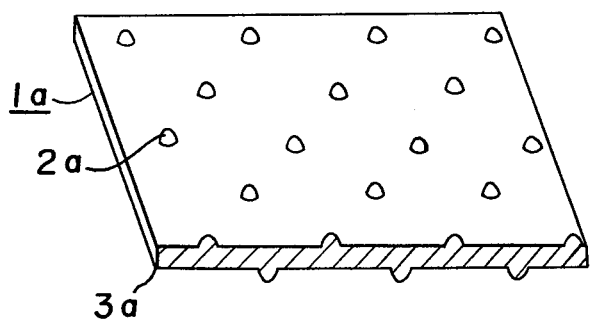
FIG. 1 shown a schematic view of a propellant sheet used in the gas generating charge as shown in FIG. 2.

This invention is based on the findings that a charge prepared by providing propellant in a form of sheets or tablets having a plurality of projections on at least one surface of each sheet and by piling a plurality of the resulting propellant sheets so as to contact them with each other is excellent in combustion characteristics and further that the propellant can be burnt up in a short time, thereby generating a large amount of gas.

The gas generating charge of this invention is obtained by a process which comprises (a) molding a composition of propellant matter consisting of nitrocellulose, a nitroplasticizer and additives, into a preliminarily formed sheet, (b) passing through the preliminarily formed sheet between two parallel rolls to obtain a final propellant sheet, the surfaces of the said two rolls being provided with the negative pattern corresponding to the shape of the surface of the desired final propellant sheet having desired projections thereon, (c) cutting the propellant sheet into a plurality of single propellant sheets, and piling and fixing these sheets.

The nitroplasticizer used in this invention includes ones which have been known, such as nitroglycerin (NG), diethyleneglycol dinitrate (DEGDN), trimethylolethane trinitrate (TMETN), and butanetriol trinitrate (BTTN).

These nitroplasticizer is used with one member or a mixture of at least two members selected from the group consisting of a plasticizer, a stabilizer, a combustion catalyst and an oxidizing agent.

The plasticizer is one which is usually used, for example, triacetin (TA), diethyl phthalate (DEP), tributylphosphate (TBP) and the like. These plasticizers are used alone or in a mixture of at least two members when they are used. The stabilizer is one used in a typical double base propellant prepared by the extruding method or the casting method.

These are, for example, diphenylamine (DA), 2-nitrodiphenylamine (2-NDA), ethyl-centralite (ECL) and the like.

The combustion catalysts are, for example, oxides of heavy metals such as lead and copper and organic or inorganic salts of the heavy metals. As the oxidizing agent, examples are inorganic oxidizing agents such as a perchlorate, a nitrate and the like or organic oxidizing agents such as cyclotrimethylene trinitramine (RDX), cyclotetramethylene tetranitramine (HMX), pentaerythritol tetranitrate (PETN) and the like.

The oxidizing agent is preferably an organic oxidizing agent because of the smokelessness of waste gases on combustion of the gas generating charge and the compatibility with the nitrocellulose (NC) component and the nitroplasticizer component, and it is desired to be small in its particle size as far as possible, preferably not larger than 100$\mu$, from the view point of safety in the rolling operation.

The composition of the propellant in sheet form used in this invention is determined according to a desired combustion performance and physical characteristics, but is usually preferably within a range of 20 to 70% based on a weight standard (the standard being applied hereinbelow) as to the nitrocellulose component, 10 to 50% as to the nitroplasticizer component, 0 to 20% as to the plasticizer, 0 to 70% as to the oxidizing agent and 1 to 10% as to the sum of the amounts of the stabilizer and the combustion catalyst.

For forming a propellant sheet, the following procedures were followed.

First, a generally fibrous nitrocellulose (NC) and a nitroplasticizer were mixed in a predetermined mixing ratio, wherein a necessary quantity of additives were added and were mixed well.

Further, the resultant mixture was preliminarily formed by rolling according to a known method, whereby the preliminarily formed sheet is obtained.

Next, the preliminarily formed sheet is rolled between two parallel rolls whose negative pattern corresponds to the shape of the surface of the desired propellant sheet, thereby obtaining a propellant sheet provided with the desired projections.

The depressions of the negative pattern of the surface of the roll are formed in the shape of a groove, hemisphere, trigonal depression, pyramid, cylinder and the like corresponding to the shape of the desired propellant sheet, but they are preferably disposed at regular intervals. The depth of the depression in the roll is determined corresponding to the height of the projections of the desired propellant sheet. When the height of the projections of the explosive powder sheet is too shallow, the gaps between neighboring bases of the gas generating charge, which are made by arranging or joining the explosive powder sheets, are not sufficient and consequently the grain gas generating charge is not desirable for its uniform and total combustion properties.

On the contrary, when the depth of the depressions in the roll is too deep, the propellant of the preliminarily formed sheets does not spread throughout completely into the depressions with ease and there is a danger of combustion of the propellant by exothermic reaction which is caused by adiabatic compression of the air left in the depression. Consequently the depth of the depression, namely, the height of the projection is preferably in a range of about 0.2~ about 2 mm.

The pair of parallel rolls is designed to provide the depressions on the surfaces of both parallel rolls or on one of the pair, as desired.

The parallel rolls are generally operated at equal roll speeds, namely a rotation ratio of 1:1.

Considering the separation of the propellant sheet from the parallel rolls, it may be operated at a slightly different roll speed.

When the rotation ratio is too large, there are possibilities for igniting the propellant and in consequence, the rotation ratio is preferably in a range of 1:1~1:1.1.

The temperature of the propellant and the roll in forming the propellant is 15°~90° C., preferably 40°~80° C., because at a low temperature the propallent is hard and it is difficult to plastically deform the propellant, and consequently it is difficult to form the projections of the propellant.

At a high temperature, the nitroplasticizer vaporizes and the sensibility for the propellant becomes high.

It is difficult to form very thin propellant sheets. Very thick propellant sheets are not desirable because it takes a long time to form a uniform sheet of the propellant having its own density.

Accordingly, the thickness of the propellant sheets is preferably about 0.4~ about 4 mm.

The formed propellant sheet is cut to form a plurality of smaller sheets of a predetermined shape, preferably round so that propellant disks are formed. Further, the smaller propellant sheets are piled, thereby obtaining the gas generating charge.

In preparing the gas generating charge, it is desirable to maintain each propellant sheet with the maintaining means.

It is also desirable for handling the gas generating charge and for improving the combustion stability thereof to join a part or all of the projections on each single propellant disk with the neighbouring propellant disks in one body by a solvent or a bonding agent.

The solvent used for this procedure is one which dissolves the propellant sheet, does not react therewith and whose boiling point is low.

As said solvent, there are known polar solvents whose boiling points are in a range of 50° to 150° C., for example, ketones such as acetone, methylethyl ketone, methylisobutyl ketone, esters such as ethyl acetate, butyl acetate, ethyl lactate, alcohols and ethers.

The solvent is used singly or as a mixed solution consisting of one or more solvents. The bonding agent is one which is compatible with the propellant which is used for the gas generating charge.

There are two methods for arranging a plurality of single propellant smaller sheets or disks into a gas generating charge. One is a method comprising cutting a propellant sheet into single smaller propellant sheets of predetermined shape and piling them. The other is a method comprising joining single propellant sheets of a suitable size into one body and processing the obtained product to obtain a gas generating charge.

Other objects and advantages of the invention will hereinafter become more fully apparent from the following description of the accompanying drawings which illustrate preferred embodiments of the invention.

Figure 2:
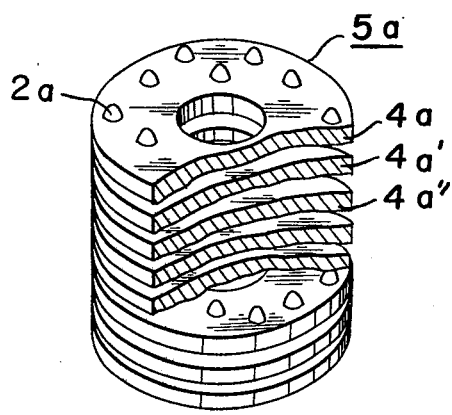
FIG. 2 shows a partly broken-away schematic view of a gas generating charge of an embodiment of this invention.

Throughout the specification and drawings like numbers designate like parts. Referring to FIGS. 1 and 2, 1a designates a propellant sheet and projections 2a, each a small hemisphere, are provided on both surfaces of a base 3a.

The propellant sheets are cut into propellant disks having the shape of doughnut type disks 4a, 4a', 4a" . . .

Further, a plurality of said propellant disks are piled as shown in FIG. 2, thereby obtaining a gas generating charge 5a.

Figure 3:
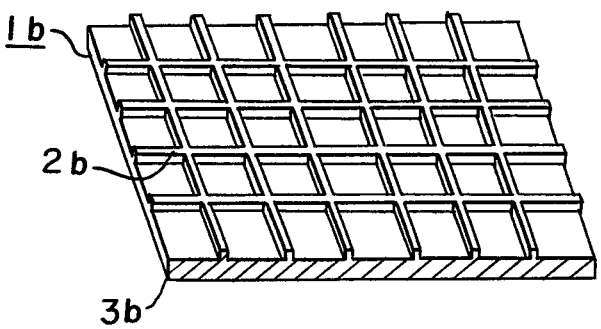
FIGS. 3 and 5 show schematic views of propellant sheets used in the gas generating charges as shown in FIGS. 4 and 6, respectively.
Figure 4:
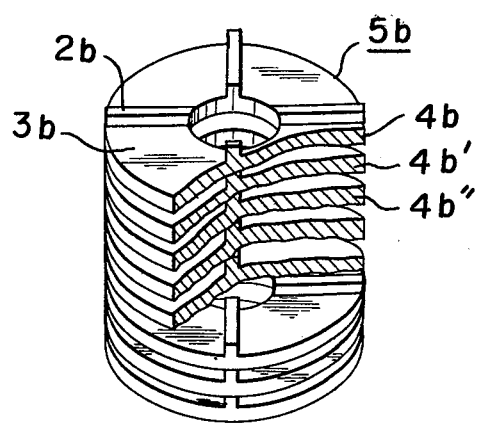
FIGS. 4 and 6 show partly broken-away schematic views of gas generating charges of other embodiments of this invention.

FIGS. 3 and 4 show a schematic view of a propellant sheet of another embodiment of this invention and a schematic view of a gas generating charge which was obtained by cutting the propellant sheet into the propellant disks 4b, 4b', 4b'' . . . as shown in FIG. 4 and by piling the same, respectively.

The propellant sheet 1b is provided with lattice projections 2b on one surface of a base 3b. The single propellant disks 4b, 4b' are piled as shown in FIG. 4, thereby obtaining a gas generating charge 5b.

Figure 5:
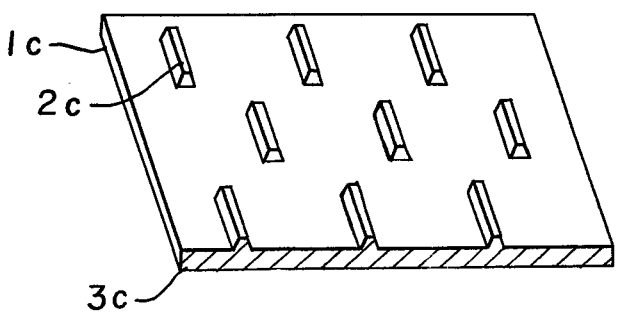
Figure 6:
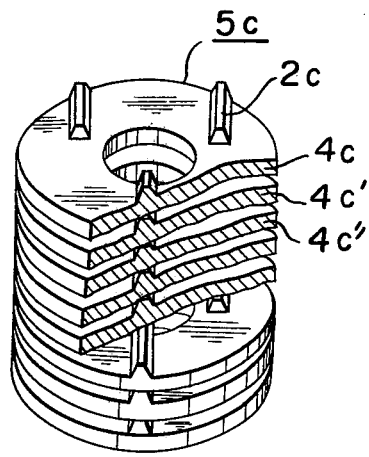

FIGS. 5 and 6 show a schematic view of propellant sheet 1c of another embodiment of this invention and a schematic view of a gas generating charge 5c which was obtained by cutting the propellant sheet 1c into propellant disks 4c, 4c' . . . and by piling the same. 2c designates stick projections and 3c designates a base.

The gas generating charge obtained according to this invention has the following advantages and effects.

(1) A propellant charge made by the known process which comprises piling propellant sheets and fixing the piled product with thread and the like, can't ignite uniformly on the total combustion surface thereof.

On the contrary, the gas generating charge of the invention is splendid in ignition characteristics, because each disk is not contacted directly with the neighbouring disk by the effect of projections.

(2) The grain of gas generator of this invention can obtain a uniform pressure-time relation because there are suitable gaps between each disk and its neighbouring disk. Accordingly, when it is used for a gas generating device, it gives a stable pressure—time relation characteristics to the gas generating device.

(3) According to the known process which is characterized in that single perforated or multiperforated propellant charges are charged in a rocket motor, a part of propellant charge is exhausted to the outside during the combustion and therefore the combustion efficiency thereof is lowered.

On the contrary, the gas generating charge of this invention is united in one body. In consequence, when the gas generating charge of this invention is used for a gas generating device, the gas generating charge is not exhausted to the outside, and therefore the combustion efficiency is very high.

(4) According to this invention, the propellant sheet may be produced without any danger of combustion, explosion and the like, although it contains explosive organic oxidizing agents such as RDX, HMX and the like.

(5) According to the present invention, the propellant sheet is formed with a base layer and projections in one body by parallel rolls having the negative pattern of recesses corresponding to the desired propellant sheet.

In consequence, the gas generating charge can be produced with ease.

Further detailed explanation of this invention is given hereinbelow by Examples. In each Example, the value of parts and percentages mean by part by weight and percent by weight except when otherwise stated.

EXAMPLE 1

53 parts of fibrous nitrocellulose were applied to suspension dispersion in water, wherein 32 parts of nitroglycerin and 11 parts of diethylphthalate were added slowly while stirring and further 2 parts of diphenylamine and 2 parts of combustion catalyst (organic lead salt) were added.

After the resultant mixture was mixed well, it was dehydrated by a centrifugal dehydrator and then it was preliminarily molded by a roll, then a preliminarily formed sheet whose thickness is 1.0 mm, containing 1% of moisture was obtained.

The preliminarily formed sheet was passed through between two parallel rolls both surfaces of which are provided with the negative patterns corresponding to the shape of the surface of the propellant sheet as shown in FIG. 1, and which were maintained at 70° C., thereby obtaining a propellant sheet. The height of the projections was 0.5 mm, and the thickness of the sheet was 0.7 mm.

The shape of the depression of the negative pattern which was provided on the surface of the parallel roll was a hemisphere whose diameter was 0.5 mm and whose depth was 0.7 mm and in which the interval between each depression was 0.5 mm. The gap between the two parallel rolls was 0.5 mm and the tangential speed of revolution thereof was 1 m/min. Next, the obtained propellant sheet was punched by a puncher which was provided with a double razor whose outside diameter was 70 mm and whose inside diameter was 20 mm, thereby obtaining a lot of doughnut type disks having projections.

Further, each projection was coated with an addhesive which was obtained by dissolving cellulose acetate into a mixed solution consisting of methyl acetate/methylisobutyl ketone/lactic ester (1/1/1 by weight ratio). The doughnut type disks were then piled in order to join projections on one doughnut type disk with the surfaces of neighbouring doughnut disks, thereby obtaining a gas generating charge which weighted 350 g and whose length was 110 mm.

The obtained charge was used in the following combustion test.

As the ignition apparatus, an ignition tube which was 20 mm in outside diameter, 16 mm in inside diameter, 120 mm in length and which was provided with 150 of gas jetting hole pieces of 1 mm diameter and which was charged with an igniter and black powder, was used.

The ignition apparatus and the aforementioned gas generating charge were charged in a gas generating apparatus.

Further, according to the known method, the combustion test for the gas generating apparatus was carried out.

As the result, the ignition and combustion thereof were normal and the pressure—time relation characteristic curve, wherein the combustion time was 0.025 sec and combustion pressure was 120 kg/cm$^2$, was normal.

EXAMPLES 2 and 3

According to the same procedures as those described in Example 1, gas generating charges were produced respectively except that the mixing composition and the forming conditions as shown in Table 1 were employed.

Next, the combustion tests for each gas generating charge were carried out according to the same procedures as used in Example 1.

As the results, the ignition and combustion for the gas generating charges were recognized to be normal and the normal pressure—time relation characteristic curves were obtained.

The obtained results are shown in Table 2.

TABLE 1

|  |  |  | Example No. | | |
|---|---|---|---|---|---|
|  |  |  | 1 | 2 | 3 |
| Mixing |  | N C | 53 | 55 | 35 |
| ratio | Nitrated | N G | 32 | 20 | 35 |

TABLE 1-continued

| | | | Example No. | | |
|---|---|---|---|---|---|
| | | | 1 | 2 | 3 |
| | plasticizer | DEGDN | — | 10 | — |
| | Plasticizer | D E P | 11 | 11 | 7 |
| | Stabilizer | D A | 2 | 2 | 2 |
| | Combustion catalyst | Organic lead salt | 2 | 2 | 1.5 |
| | Oxidiazing agent | H M X | — | — | 30 |
| | | R D X | — | — | — |
| | | Total | 100 | 100 | 100 |
| Forming conditions for propellant sheet | Depression of roll | Surface | Both surfaces | One surface | One surface |
| | | Shape | Hemisphere | groove | groove |
| | | Gap between rolls (mm) | 0.7 | 1.0 | 1.5 |
| | | Interval (mm) | 5.0 | 60.0 | 20.0 |
| | Rolling Conditions | Rotation ratio | 1:1 | 1:1.05 | 1:1.08 |
| | | Temperature (°C.) | 60 | 50 | 50 |
| | | Interval (mm) | 0.5 | 0.6 | 2.2 |
| | Thickness of preliminarily formed propellant sheet | | 1.0 | 1.2 | 4.5 |
| Propellant sheet | Shape | Thickness of base (mm) | 0.7 | 1.0 | 3.6 |
| | | Shape of projection | Hemisphere | Stick | Stick |
| | | Height of projection | 0.6 | 0.9 | 1.4 |
| | | Interval between projections | 5.0 | 60.0 | 20.0 |
| | Appearance | | Good | Good | Good |
| | Moisture (%) | | 0.2 | 0.3 | 0.3 |
| | Density (g/cm³) | | 1.57 | 1.58 | 1.65 |

TABLE 2

| | Example No. | | |
|---|---|---|---|
| | 1 | 2 | 3 |
| Gas generating change | | | |
| Outside diameter (mm) | 70 | 70 | 70 |
| Inside diameter (mm) | 20 | 20 | 25 |
| Length (mm) | 110 | 250 | 150 |
| Weight (g) | 350 | 500 | 500 |
| Joining ratio of projections | total | total | part |
| Result | | | |
| Pressure (kg/cm²) | 120 | 100 | 80 |
| Time (sec) | 0.025 | 0.035 | 0.115 |
| Pressure-time relation characteristics | flat | flat | flat |
| Combustion | normal | normal | normal |

The embodiments of the invention in which an exclusive property or privilege is claimed as follows:

1. A propellant charge capable of rapid combustion to generate a large volume of combustion gas in a short time, comprising: a stack of a plurality of relatively thin layers of relatively large surface area and which are joined to each other to form the propellant charge, said layers being made of a solid combustible propellant composition and having substantially parallel upper and lower surfaces, the lower surface of each of said layers being opposed to, spaced from and extending substantially parallel with the upper surface of the adjacent lower layer in said stack, each of said layers having a plurality of projections of relatively small surface area and height on at least one of said surfaces thereof and extending into contact with the opposing surface of the adjacent layer in said stack so that said layers are maintained spaced from each other, the surface areas of said projections being small relative to the surface areas of said surfaces of said layers to provide gaps of large area between adjacent layers so that said layers have large surface areas exposed for uniform ignition and burning to generate a large volume of combustion gas in a short time.

2. A propellant charge as claimed in claim 1, wherein said upper and lower surfaces of said layers are planar, the thickness of each of said layers, measured between said upper and lower surfaces thereof, is a uniform thickness in the range of from 0.4 to 4.0 mm, the height of said projections is in the range of from 0.2 to 2.0 mm and said projections are arranged in a regularly repeating pattern and are spaced apart from each other across said one surface of each layer.

3. A propellant charge as claimed in claim 1, wherein said projections are arranged in a rectangular grid.

4. A propellant charge as claimed in claim 1, wherein said projections are of pyramidal shape, are arranged in a regularly repeating pattern and are spaced from each other across said one surface of each layer.

5. A propellant charge as claimed in claim 1, wherein said projections are of trigonal shape, are arranged in a regularly repeating pattern and are spaced from each other across said one surface of each layer.

6. A propellant charge as claimed in claim 1, wherein said projections are of hemispherical shape, are arranged in a regularly repeating pattern and are spaced from each other across said one surface of each layer.

7. A propellant charge as claimed in claim 1, wherein said projections are of cylindrical shape, are arranged in a regularly repeating pattern and are spaced from each other across said one surface of each layer.

8. A propellant charge as claimed in claim 1, wherein said layers are annular, coaxial disks.

9. A propellant charge as claimed in claim 1, wherein said layers are united to each other by a bonding agent compatible with and inert to said propellant composition, said bonding agent being applied to said projections and bonding said projections to the portions of the opposing surface of the adjacent layer that contacts said projections.

10. A propellant charge as claimed in claim 9, wherein said bonding agent is a polar solvent having a boiling point in the range of 50° to 150° C. which is capable of dissolving said propellant composition.

11. A propellant charge as claimed in claim 1, wherein said propellant composition consists essentially of 20 to 70 wt. % of nitrocellulose, 10 to 50 wt. % of a nitroplasticizer, 0 to 20 wt. % of a plasticizer, 0 to 70 wt. % of an oxidizing agent, and a total of 1 to 10 wt. % of a stabilizer and a combustion catalyst.

12. A process for producing a propellant charge comprising:
(a) forming a propellant composition comprising nitrocellulose and a nitroplasticizer into a sheet;
(b) passing said sheet between a pair of rotating, parallel molding rolls so that said sheet passes in a direction transverse to the axes of rotation of said rolls, the outer surface of at least one of said rolls having a plurality of recesses formed therein, whereby said sheet is molded between said rolls and projections corresponding to said recesses are formed on said sheet;
(c) then cutting said sheet into a plurality of layers having upper and lower substantially planar surfaces, at least one of said surfaces having said projections formed thereon and projecting therefrom;

(d) stacking said layers in face-to-face order, such that the upper and lower surfaces of each of said layers are spaced apart from corresponding surfaces of adjacent layers by means of said projections; and (e) joining said layers such that said stack forms a united body, said stack of joined layers comprising said propellant charge.

13. A process as claimed in claim 12, wherein the rotation speed ratio of said pair of parallel molding rolls is in the range of 1:1 to 1:1.1.

14. A process as claimed in claim 12, wherein said recesses are formed in one of said rolls, the other of said rolls being free of said recesses.

15. A process as claimed in claim 12, wherein said projections comprise rectangular bars.

16. A propellant charge as claimed in claim 12, wherein said projections are of pyramidal shape.

17. A propellant charge as claimed in claim 12, wherein said projections are of trigonal shape.

18. A propellant charge as claimed in claim 12, wherein said projections are of hemispherical shape.

19. A propellant charge as claimed in claim 12, wherein said projections are of cylindrical shape.

20. A process for producing a propellant charge capable of rapid gas generation when said propellant charge is subjected to combustion, comprising the steps of:

(a) forming a propellant composition consisting essentially of 20 to 70 wt. % of nitrocellulose, 10 to 50 wt. % of a nitroplasticizer, 0 to 20 wt. % of a plasticizer, 0 to 70 wt. % of an oxidizing agent and 1 to 10 wt. % of a stabilizer and a combustion catalyst, into a sheet;

(b) passing said sheet between a pair of rotating, parallel molding rolls so that said sheet passes in a direction transverse to the axes of said rolls, said rolls rotating at approximately the same speed, said propellant and said rolls being at a temperature in the range of 15° to 90° C., the outer surface of at least one of said rolls having a plurality of regularly spaced recesses formed therein, whereby said sheets are molded between said rolls and a regular pattern of projections corresponding to said recesses is formed on said sheet, said projections having a height in the range of 0.2 to 2.0 mm;

(c) cutting said molded sheet into a plurality of thin annular disks having central holes therein and upper and lower planar faces, at least one of said faces of each of said disks having said projections formed thereon, said disks having a thickness in the range of 0.4 to 4.0 mm, as measured between the respective upper and lower faces thereof;

(d) stacking said disks coaxially and in face-to-face order, such that the upper and lower faces of each of said disks are spaced apart from corresponding faces of adjacent disks by means of said projections; and (e) joining said disks so that said stack forms a united body, said stack of joined disks comprising said propellant charge.

* * * * *